Aug. 4, 1953　　　　　L. D. HOLMES　　　　　2,647,272
APPARATUS ADAPTED FOR USE IN WASHING EAVES OF RAILWAY AND
OTHER VEHICLES AND EMBODYING ONE OR MORE ROTARY
POWER-DRIVEN BRUSHES MOUNTED TO SWING
BODILY UP AND DOWN AND ALSO TO TILT
Filed Sept. 16, 1948　　　　　　　　　　　　　　　5 Sheets-Sheet 1

Inventor
Louis D Holmes
By: Fred Gerlach
Atty

Aug. 4, 1953

L. D. HOLMES 2,647,272

APPARATUS ADAPTED FOR USE IN WASHING EAVES OF RAILWAY AND
OTHER VEHICLES AND EMBODYING ONE OR MORE ROTARY
POWER-DRIVEN BRUSHES MOUNTED TO SWING
BODILY UP AND DOWN AND ALSO TO TILT

Filed Sept. 16, 1948

Inventor
Louis D. Holmes
By: Fred Gerlach atty

Aug. 4, 1953     L. D. HOLMES     2,647,272
APPARATUS ADAPTED FOR USE IN WASHING EAVES OF RAILWAY AND
OTHER VEHICLES AND EMBODYING ONE OR MORE ROTARY
POWER-DRIVEN BRUSHES MOUNTED TO SWING
BODILY UP AND DOWN AND ALSO TO TILT
Filed Sept. 16, 1948     5 Sheets-Sheet 3

Inventor
Louis D. Holmes
By: Fred Herlach atty

Aug. 4, 1953     L. D. HOLMES     2,647,272
APPARATUS ADAPTED FOR USE IN WASHING EAVES OF RAILWAY AND
OTHER VEHICLES AND EMBODYING ONE OR MORE ROTARY
POWER-DRIVEN BRUSHES MOUNTED TO SWING
BODILY UP AND DOWN AND ALSO TO TILT
Filed Sept. 16, 1948     5 Sheets-Sheet 4

Inventor
Louis D. Holmes
By: Fred Gerlach atty.

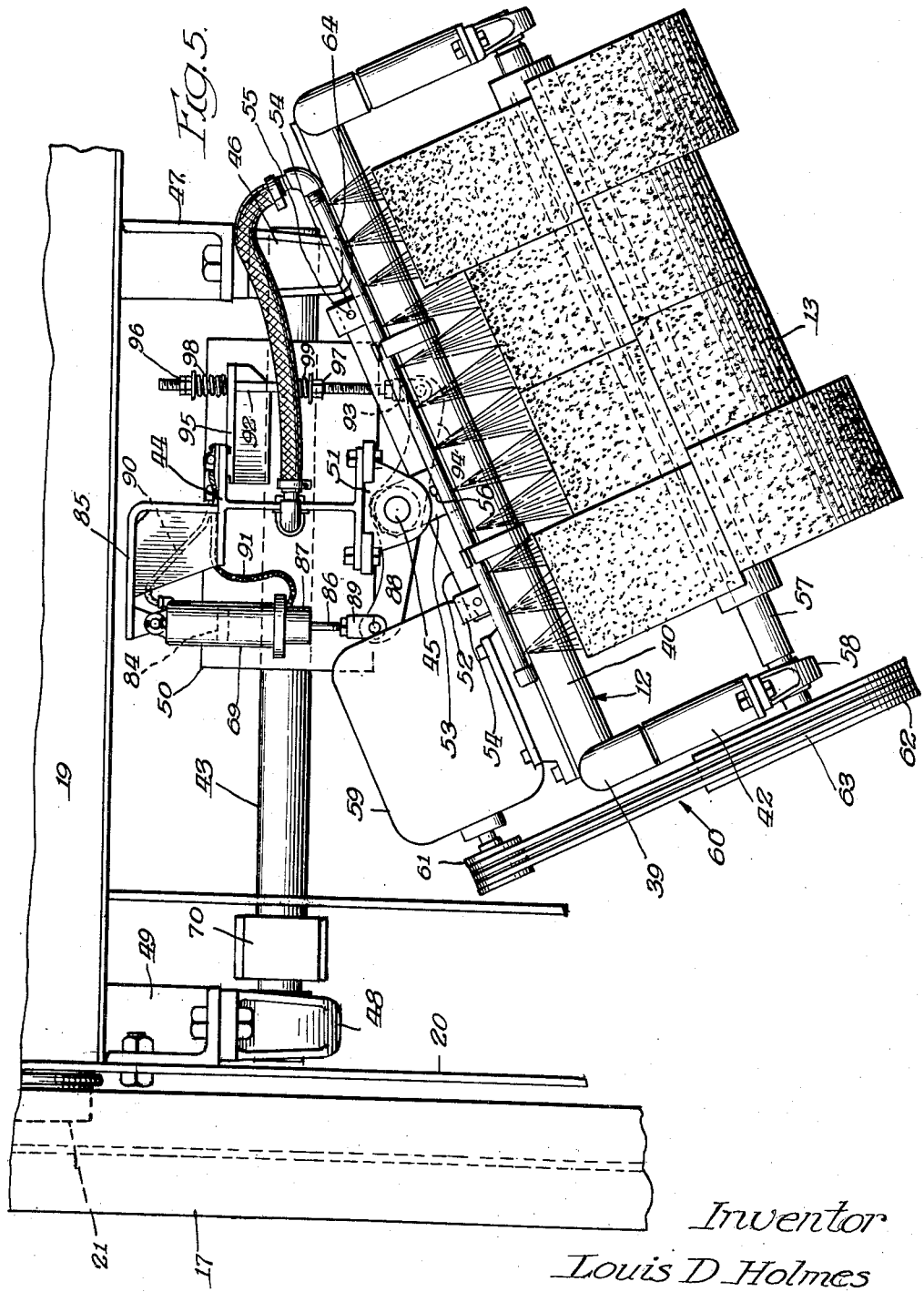

Patented Aug. 4, 1953

2,647,272

UNITED STATES PATENT OFFICE 2,647,272

APPARATUS ADAPTED FOR USE IN WASHING EAVES OF RAILWAY AND OTHER VEHICLES AND EMBODYING ONE OR MORE ROTARY POWER-DRIVEN BRUSHES MOUNTED TO SWING BODILY UP AND DOWN AND ALSO TO TILT

Louis D. Holmes, Blue Island, Ill., assignor to Whiting Corporation, Harvey, Ill., a corporation of Illinois Application September 16, 1948, Serial No. 49,586

13 Claims. (Cl. 15—53)

The present invention relates generally to apparatus for washing the roof portions of railway cars and like or other vehicles. More particularly the invention relates to that type of washing apparatus which is designed primarily to wash the eaves of railway cars, i. e., the downwardly inclined side portions of the roofs, operates to effect washing of the eaves during propulsion of the railway cars therepast at a comparatively low rate of speed, and comprises a pair of spaced apart, rotary, power driven brushes and in addition an inverted U-shaped supporting structure over the track along which the cars to be washed are propelled.

One object of the invention is to provide an eaves washing apparatus of this type which is an improvement upon, and has certain inherent advantages over, previously designed apparatuses for the same purpose and of the same general character and is characterized by high efficiency, simplicity of construction and a novel arrangement of parts.

Another object of the invention is to provide a washing apparatus of the type under consideration in which the two rotary, power driven brushes for effecting washing of the eaves of the cars as the latter are slowly propelled past the apparatus are located adjacent the upper corners of the inverted U-shaped supporting structure, are upwardly and inwardly inclined, and are carried by individual frames which are mounted or supported in such manner that the brushes are individually capable of swinging bodily upwards and downwards and also rocking transversely of the railway car being washed.

Another object of the invention is to provide an eaves washing apparatus of the last mentioned character in which the brush carrying frames have associated therewith double acting air cylinders which serve transversely to rock the brushes into different angular positions in order to adapt them for operation on cars, the eaves of which vary in contour or slope, and also serve yieldingly to hold the brushes in the various or different angular positions into which they are rocked.

Another object of the invention is to provide an eaves washing apparatus of the type and character under consideration in which the brush carrying frames have associated therewith additional air cylinders which when energized by the supply of air under pressure thereto urge the brushes bodily downwards into contacting relation with the eaves on the car being washed.

A further object of the invention is to provide an eaves washing apparatus in which the two brush carrying frames are mounted on the ends of a horizontally elongated carriage which extends between, and is vertically slidable with respect to, the upper ends of the standards of the inverted U-shaped supporting structure and has associated therewith power means whereby it may be raised or lowered in order to bring the brushes into and out of operative positions.

A still further object of the invention is to provide an eaves washing apparatus which is generally of new and improved construction, effectively and efficiently fulfills its intended purpose and is capable of being produced and operated at a comparatively low cost.

Other objects of the invention and the various advantages and characteristics of the present eaves washing apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like letters and numerals of reference denote corresponding parts throughout the several views.

Figure 3:
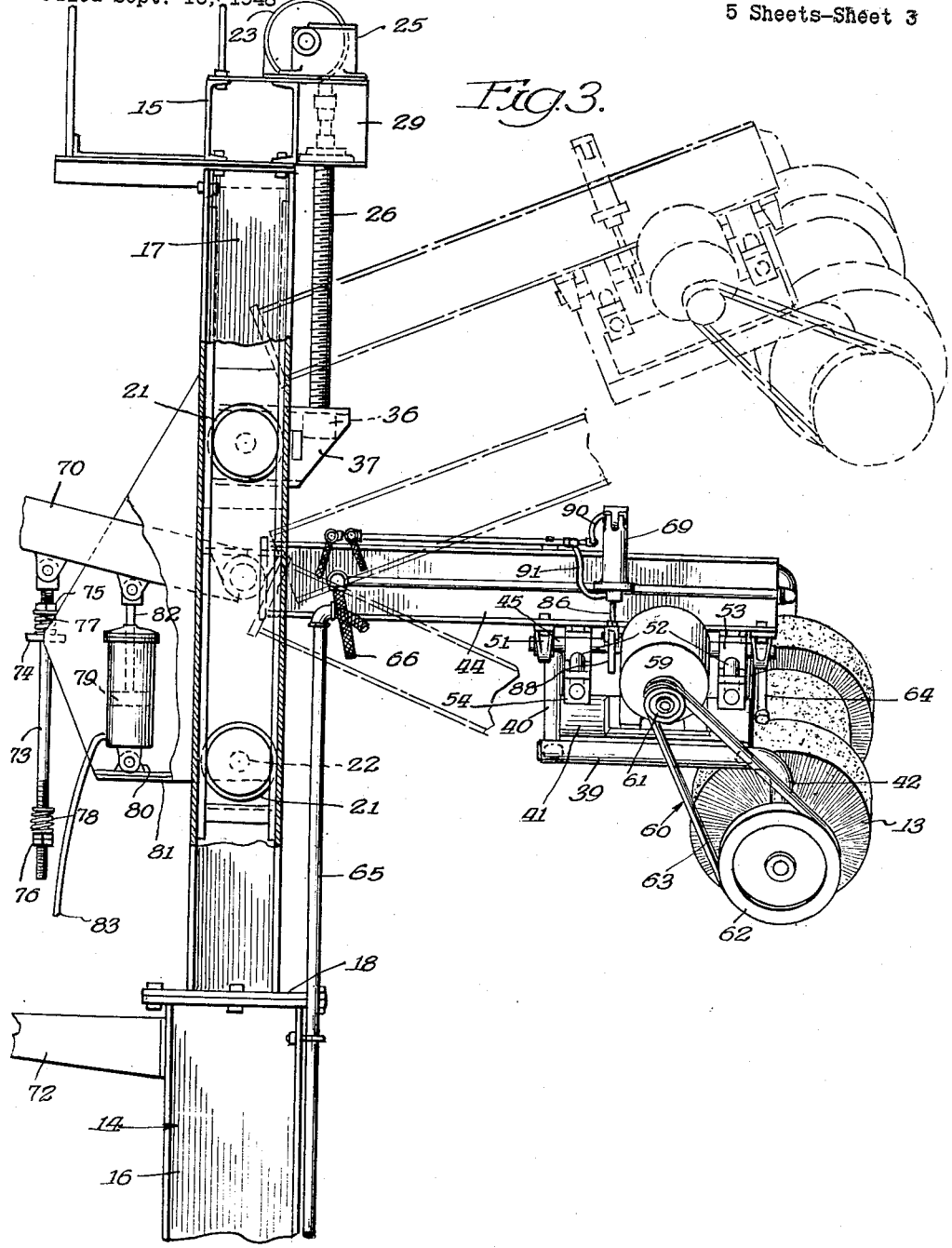
Figure 4:
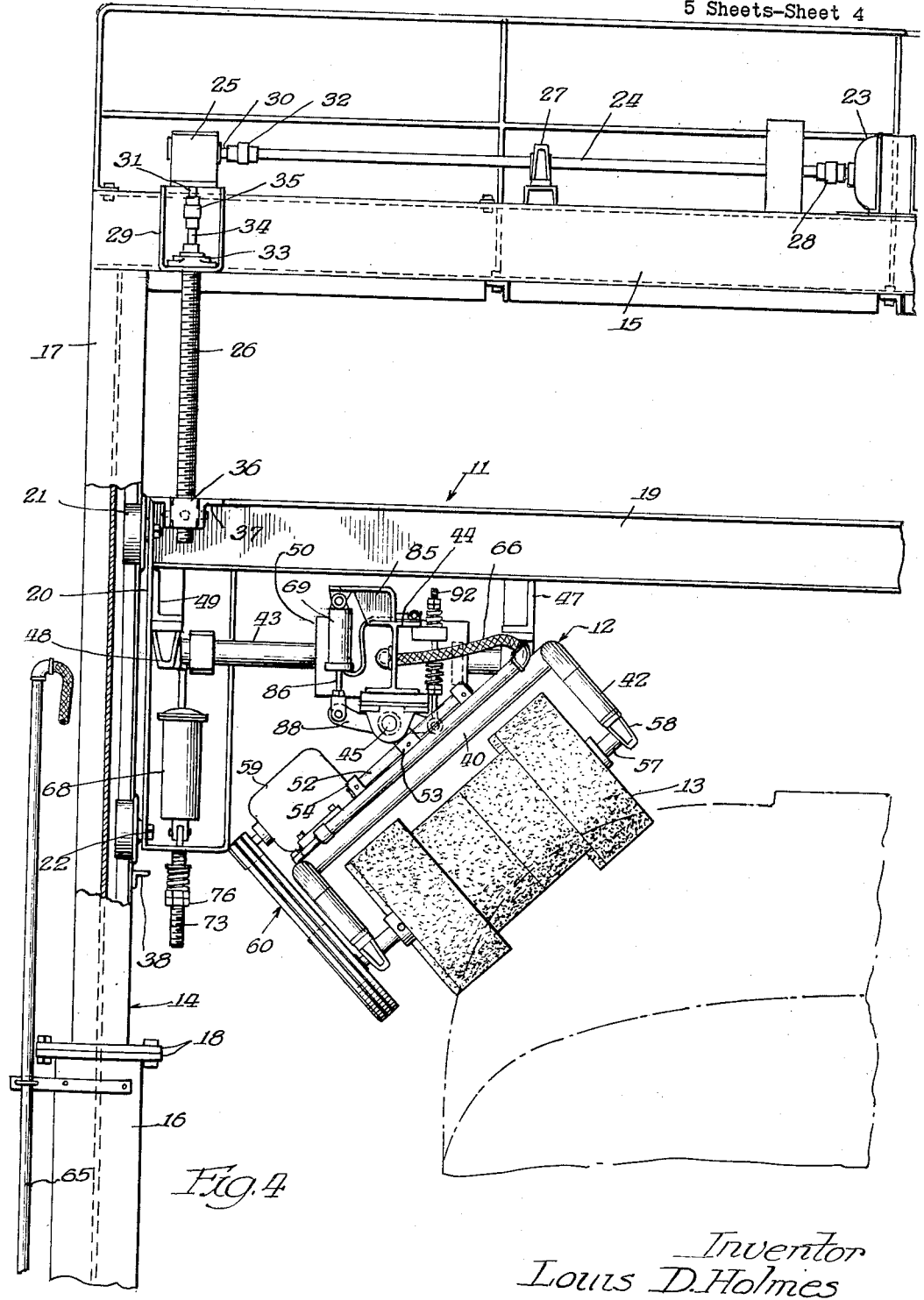

Figure 3 is a fragmentary side view illustrating in detail the manner in which the brush carrying frames are pivotally connected to the ends of the horizontally elongated carriage in order that the brushes are capable of swinging bodily upwards and downwards, and also illustrating in detail the sliding connections between the ends of the carriage and the upper ends of the standards of the inverted U-shaped supporting structure and the power mechanism for effecting raising and lowering of the carriage;

Figure 4 is an enlarged elevation of the upper left portion of the apparatus as viewed from the rear, certain parts being broken away and certain parts being shown in section for purposes of illustration; and Figure 5 is an enlarged elevation of the left hand eaves washing brush as viewed from the rear of the apparatus, illustrating in detail the manner in which the brush carrying frames are supported or mounted so that the brushes are capable of rocking transversely with respect to the eaves of the car being washed and showing the construction and arrangement of the double acting air cylinders for rocking the frames into different angular positions and yieldingly holding the frames in the positions into which they are rocked.

The apparatus which is shown in the drawings constitutes the preferred form or embodiment of the invention. It is designed and adapted automatically to wash the eaves of the roof of a railway car C as the latter is propelled on a track T past the apparatus and as its principal parts or components comprises a supporting structure 10, a carriage 11, a pair of frames 12, and a pair of brushes 13. As hereinafter described more in detail the carriage 11 is mounted for vertical sliding movement on the supporting structure 10, the frames 12 are mounted on the ends of the carriage so that they are capable of swinging upwards and downwards about a horizontal axis, and the brushes 13 are mounted rotatably on the rear or distal portions of the frames.

The supporting structure 10 is shaped conformably to an inverted square U and consists of a pair of laterally spaced vertical standards 14 and an upper cross beam 15. The standards 14 are positioned in straddled relation with the track T and consist of large sized lower I-beams 16 and smaller sized upper I-beams 17. The track T along which the car C is propelled past the washing apparatus in connection with washing of the roof thereof consists of a pair of laterally spaced rails t and these are suitably mounted with respect to the floor where the washing apparatus is located. The lower I-beams 16 have the lower ends thereof suitably anchored to the floor and are preferably arranged so that the webs thereof extend parallel to the rails of the track T. The upper ends of the lower I-beams 16 are provided with horizontal plates 18 to which the lower ends of the upper I-beams 17 are welded or otherwise fixedly secured. As shown in the drawings, the upper I-beams extend in longitudinal alignment with the lower I-beams 16 and are arranged so that the webs are in parallel relation with the track rails t. The upper cross beam 15 of the supporting structure 10 is of so-called box section and extends between and surmounts the standards 14. The ends of the upper cross beam 15 rest on, and are welded or otherwise fixedly secured to, the upper ends of the small sized I-beams 17. The height of the standards 14 is such that the upper cross beam 15 of the supporting structure is positioned an appreciable distance above the roof of the car C. The inverted U-shaped supporting structure 10 is essentially a rigid unitary structure.

The carriage 11 underlies and is in parallel relation with the upper cross beam 15 of the supporting structure 10 and extends between the small sized upper I-beams 17 of the standards 14. It is of rigid unitary construction and consists of a horizontally extending I-beam 19 and a pair of vertically extending plates 20. The I-beam 19 extends parallel to the upper cross beam 15 of the supporting structure and is arranged so that the web thereof extends vertically. The vertically extending end plates 20 depend from the horizontally extending I-beam 19 and have the upper ends thereof welded to the ends of said beam. They are positioned directly inwards of, and are of less height than, the upper I-beams 17 of the standards 14 and carry upper and lower flanged wheels 21. The latter are rotatably mounted on horizontally extending stub axles 22 and fit between the inner portions of the flanges of the upper I-beams 17. The inner ends of the stub axles 22 are suitably fixedly connected to the end plates 20 of the carriage. The wheels 21 coact with track-forming strips on the inner portions of the flanges of the upper I-beams 17 to form connections whereby the carriage 11 as a whole is slidable upwards and downwards. It is contemplated that when the washing apparatus is in use the carriage will be slid downwardly into an operative position wherein the horizontally extending I-beam 19 is positioned a small distance above the roof of the car C and when the apparatus is not in use the carriage will be slid upwards into an inoperative position wherein the I-beam 19 thereof is located an appreciable distance above the roof of the car C. Raising and lowering of the carriage 11 is effected by way of power mechanism which is mounted for the most part on the upper cross beam 15 of the supporting structure 10 and comprises a reversible electric motor 23, a pair of horizontally extending shafts 24, a pair of worm gear variety speed reducing units 25 and a pair of vertically extending screw shafts 26. The electric motor 23 is mounted on the central portion of the upper cross beam 15 of the inverted U-shaped supporting structure 10 and is arranged so that the armature shaft thereof extends horizontally and in parallel relation with the cross beam. The horizontally extending shafts 24 are disposed at opposite sides of the reversible electric motor 23 and overlie and extend parallel to the cross beam 15. They are journalled in suitable bearings 27 on the cross beam 15 and have the inner ends thereof connected to the ends of the armature shaft of the motor 23 by couplings 28. The speed reducing units 25 are mounted on rectangular brackets 29 and embody horizontally extending drive shafts 30 and vertically extending driven shafts 31. The brackets 29 are fixedly connected to, and project rearwards from, the ends of the horizontally extending upper cross beam 15 of the supporting structure and are located a small distance inwards of the end plates 20 of the carriage 11. Certain ends of the horizontally extending driven shafts 30 of the worm gear variety speed reducing units 25 are connected to the outer ends of the shafts 24 by couplings 32. The lower ends of the vertically extending driven shafts 31 of the speed reducing units 25 project downwards through holes in the upper portions of the brackets 29 and terminate within the central portions of the brackets. The vertically extending screw shafts 26 are disposed beneath, and in coaxial relation with, the driven shafts 31 and have the upper ends thereof journalled in bearings 33 and provided with stems 34. The latter are connected to the lower ends of the driven shafts 31 by couplings 35. The bearings 33 are mounted on the lower portions of the brackets 29 and are so designed and constructed that they hold the screw shafts 26 against axial displacement while at the same time permitting them to rotate about their axes. The lower ends of the screw shafts 26 extend through nuts 36 which are carried by rearwardly extending brackets 37 on the ends of the I-beam 19 of the carriage 11. The worm gear variety speed reducing units 25 are so constructed and arranged that when the electric motor 23 is driven in one direction they operate conjointly to drive the screw shafts 26 in one direction and when the electric motor is reversely driven they operate conjointly to drive the screw shafts in the opposite direction. When the screw shafts are driven in one direction they operate through the medium of the nuts 36 positively to raise the carriage 11 and when they are driven in the reverse direction they coact with the nuts positively to lower the carriage. Downward sliding movement of the carriage 11 is limited by a pair of horizontally extending angle bars 38. These angle bars are welded or otherwise fixedly secured to the inner portions of the flanges of the upper I-beams 17 and are spaced a small distance above the plates 18 to which the lower ends of said I-beams are connected.

Figure 1:
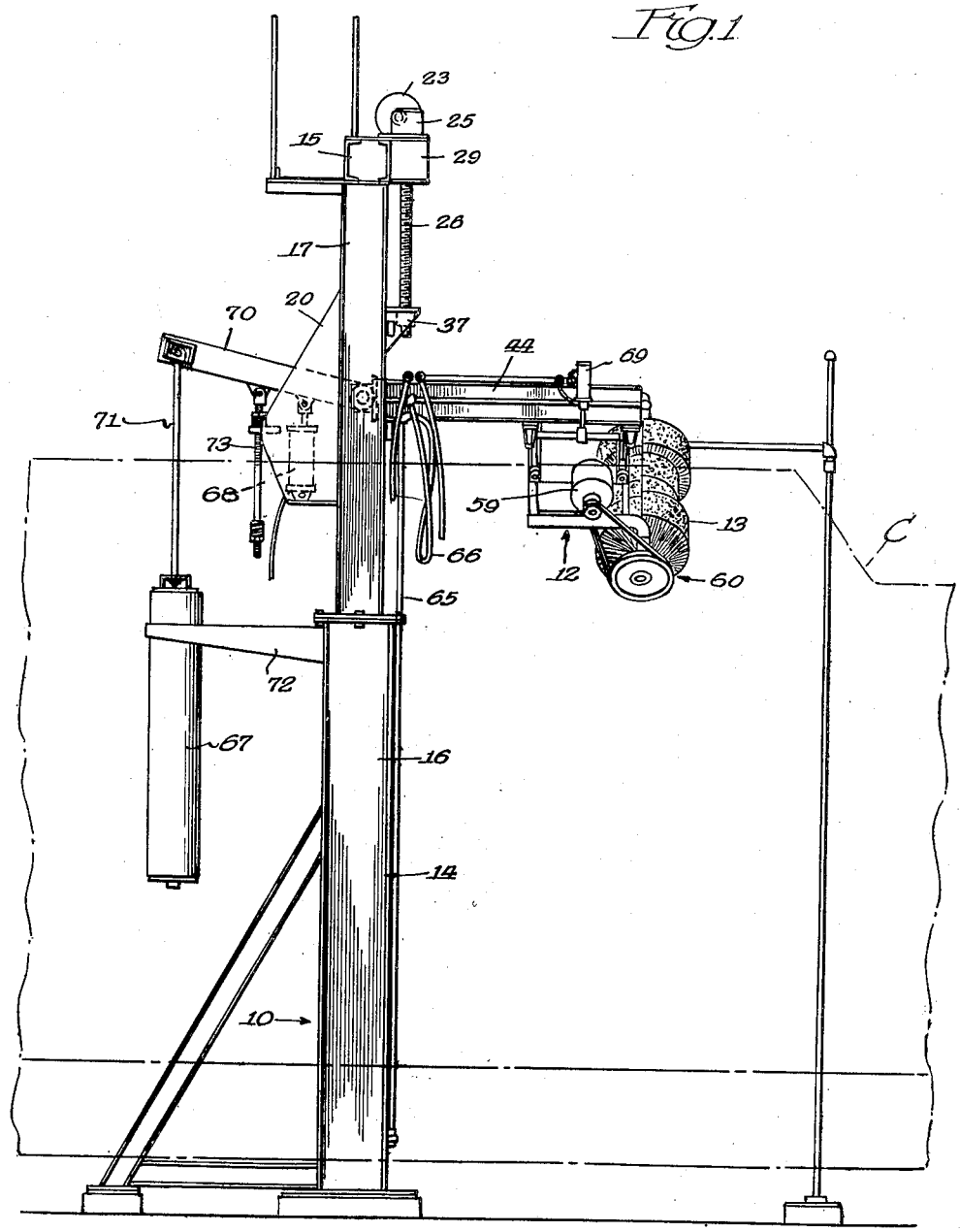
Figure 1 is a side view of an eaves washing apparatus embodying the invention.
Figure 2:
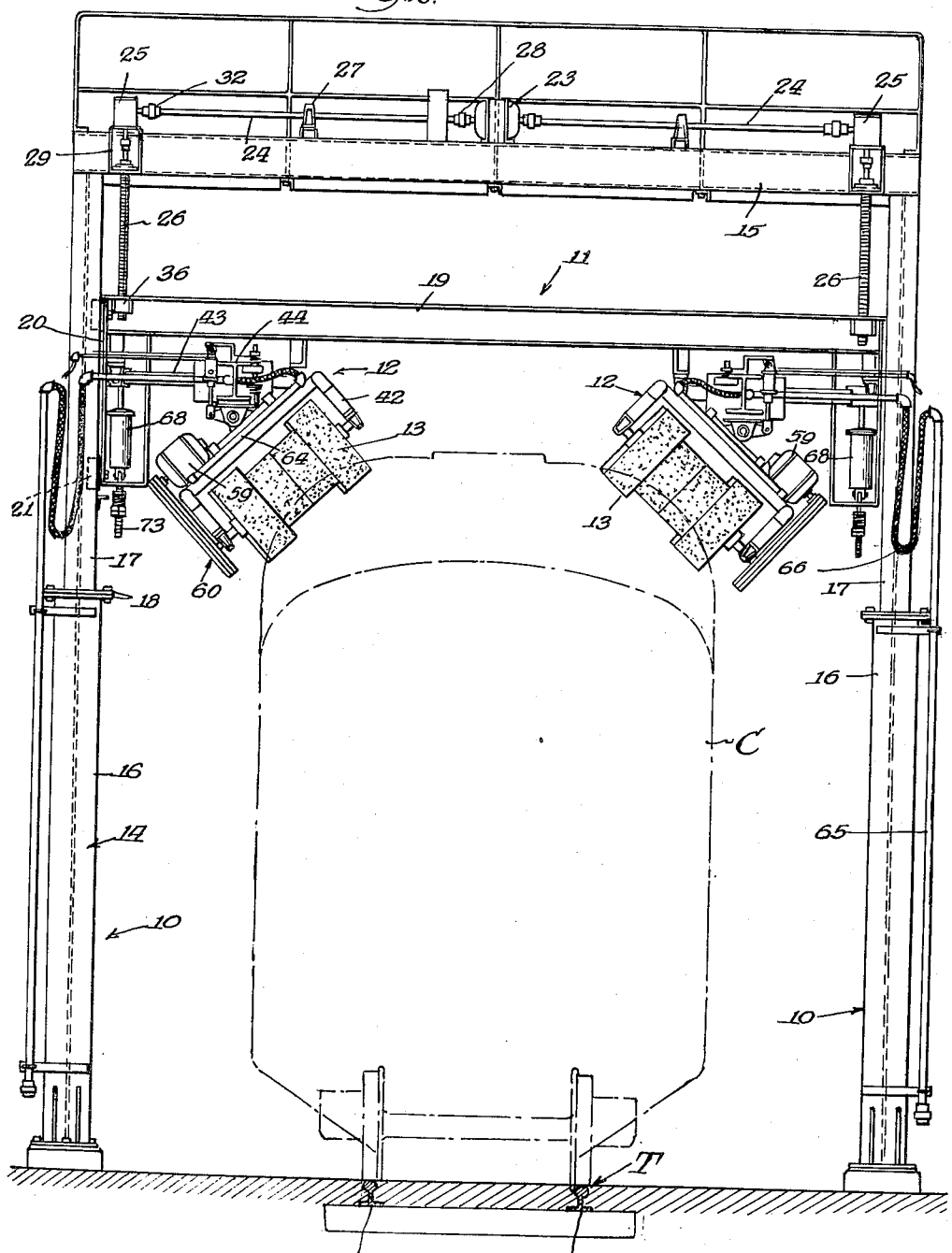
Figure 2 is a rear elevation.

The frames 12 carry the brushes 13 as hereinafter described and are located adjacent and slightly rearwards of the upper corners of the inverted U-shaped supporting structure 10. They are generally rectangular in contour and consist of inner and outer tubular side members 39, front and rear tubular end members 40 and top plates 41. The inner and outer side members are arranged in parallel relation and are cross connected at their front ends by the front end members. The rear ends of the inner and outer side members are cross connected by the rear end members and are bent downwards at right angles to form depending extensions 42. The top plates 41 of the frames 12 overlie the members 39 and 40 and have the marginal portions thereof welded or otherwise fixedly secured to the top portions of said members. As clearly illustrated in the drawings the frames 12 are inclined upwards and inwards in order angularly to position the brushes 13 for contact or engagement with the eaves of the roof of the car C. They are of rigid or unitary construction and are mounted so that they move upwards and downwards with the vertically slidable carriage 11, are capable of swinging bodily upwards and downwards about a horizontal axis at right angles to the track T and are also capable of tilting up and down transversely of the car C. Each of the mountings for the brush carrying frames 12 comprises a horizontally extending shaft 43, an arm forming I-beam 44 and a rock shaft 45. The shafts 43 of the mountings for the frames underlie and extend parallel to the ends of the I-beam 19 constituting one of the parts of the vertically slidable carriage 11. They are arranged in coaxial relation and have the inner ends thereof journalled in bearings 46 which are connected to, and depend from, vertically extending brackets 47. The upper ends of the brackets are welded or otherwise fixedly secured to the lower flange of the I-beam 19. The outer ends of the horizontally extending shafts 43 are journalled in bearings 48 and these are connected to, and depend from, angle brackets 49 which are bolted to the upper portions of the vertically extending plates 20 of the carriage 11. The I-beams 44 extend at right angles to, and project rearwards from, the shafts 43. They are arranged so that the webs thereof extend vertically. The front ends of the I-beams 44 are welded to plates 50 which fit against, and are welded to, the central portions of the horizontally extending shafts 43. The brush carrying frames 12, as best shown in Figures 1 and 3 of the drawings, underlie the rear or distal ends of the I-beams 44. The rock shafts 45 underlie and extend parallel to the I-beams 44 and overlie the central portions of the top plates 41 of the brush carrying frames. The ends of the rock shafts 45 are journalled in bearings 51 and these are connected to, and depend from, the lower flanges of the I-beams 44. The brush carrying frames are operatively connected to the rock shafts 45 by rods 52 and blocks 53. The rods 52 closely overlie the end margins of the top plates 41 of the frames 12 and are arranged in parallel relation with the tubular end members 40. They are positioned beneath the ends of the rock shafts and have their ends fixedly mounted within apertured lugs 54 which are welded to, and project upwards from, the frame top plates 41 and embody radially extending set screws 55 for fixedly securing the rods 52 in place. The blocks 53 are vertically elongated and have the upper ends thereof suitably fixedly secured to the ends of the rock shafts. The lower ends of the blocks have open ended bores through which the rods 52 extend slidably. They also embody transversely extending set screws 56 for locking the rods together with the brush carrying frames against sliding movement relatively thereto. The horizontally extending shafts 43 which underlie and are in parallel relation with the ends of the carriage I-beam 19 form pivotal connections whereby the frames 12 are permitted to swing bodily upwards and downwards relatively to the carriage 11 and the rock shafts 45 form pivotal connections whereby the brush carrying frames are permitted to rock up and down in a direction that is transverse to, or crosswise of, the car being washed. The rods 52 and the set screw carrying blocks 53 constitute adjustable connections between the brush carrying frames and the rock shafts whereby the frames may be adjusted laterally in either direction with respect to the rock shafts. It is contemplated that such connections will be utilized when the apparatus is installed in order properly to position the brush carrying frames with respect to one another. If it is found that the frames are too close together or too far apart the set screws 56 are loosened and then the frames are adjusted in the proper direction to accomplish proper spacing thereof. After adjustment the set screws are tightened so as to lock the blocks 53 to the rods 52.

The brushes 13 of the apparatus consist of side by side circular bristle-equipped sections and these are fixedly mounted on the central portions of shafts 57. The latter are disposed in parallel relation with the tubular end members of the frames 12 and have their ends journalled in depending bearings 58 on the lower ends of the extensions 42 in order that the brushes are supported rotatably. Rotation of the brushes is effected by unidirectional electric motors 59 and pulley and belt connections 60. The motors 59 overlie and are fixedly secured to the outer central portions of the frame top plates 41 and are arranged so that the armature shafts thereof are in parallel relation with the brush shafts 57. The pulley and belt connections 60 consist of pulleys 61 on the outer ends of the armature shafts of the motors 59, pulleys 62 on the outer ends of the brush shafts 57 and belts 63 around the pulleys 61 and 62. It is contemplated that in connection with an eaves washing operation the brushes will be continuously or constantly driven in such direction that the lower portions thereof travel in the same direction as the car being washed. Water or a washing liquid is sprayed downwards onto the brushes 13 by way of spray pipes 64. The latter extend along, and are suitably secured to, the rear end members of the brush carrying frames and receive water or washing liquid under pressure from vertically extending supply pipes 65. The latter are suitably attached to the standards 14 of the vertical supporting structure 10 and have the upper ends thereof connected to the inner ends of the spray pipes 64 by piping including flexible hoses 66. The latter permit the frames 12 together with the rotary brushes 13 to swing bodily upwards and downwards and also to rock or tilt transversely of the car being washed.

In addition to the parts or elements heretofore mentioned the apparatus comprises a pair of counterweights 67 for partially counterbalancing the brush carrying frames 12 in connection with up and down swinging movement thereof, a pair of air cylinders 68 for urging the frames downwards against the force of the counterweights in order yieldingly to maintain the rotary brushes 13 in contact with the eaves of the car being washed, and a pair of double acting air cylinders 69 for rocking the frames in order to position the brushes at the proper angle for efficient washing of the eaves of the roof of the car being washed.

The counterweights are associated with the brush carrying frames respectively and are located forwards of the standards 14 of the inverted U-shaped frame 10. They are operatively connected to the frames by means of forwardly extending arms 70 and upstanding links 71. The rear ends of the arms are disposed directly inwards of the depending bearings 48 and are fixedly connected to the outer ends of the horizontally extending shafts 43 constituting the pivotal connections whereby the frames together with the brushes are permitted bodily to swing upwards and downwards. The lower ends of the upstanding links are connected to the upper ends of the counterweights 67 and the upper ends of the links are pivotally connected to the front or distal ends of the arms 70. The counterweights 67 are so weighted that when the air cylinders 68 are inoperative they operate to swing the frames 12 together with the brushes 13 upwards into an inoperative position wherein the brushes are out of contact with the eaves of a car under the supporting structure 19. Forwardly and horizontally extending arms 72 serve to guide the counterweights 67 in connection with vertical movement thereof. The rear ends of the arms are fixedly connected to the upper ends of the lower I-beams 16 of the standards 14 and the outer ends of the arms are bifurcated to receive the counter-weights. Upward and downward swinging movement of the brush carrying frames 12 is limited or restricted by way of vertically extending restraining rods 73. The upper ends of these rods are pivotally connected to the central portions of the forwardly extending arms 70 and the lower ends of the rods extend loosely through holes in horizontally extending plates 74. The latter are welded to, and extend inwards from, the central portions of the vertically extending plates 20 constituting parts of the carriage 11. Nuts 75 are mounted on the upper ends of the restraining rods 73 and serve as stops for limiting upward swinging of the brush carrying frames and nuts 76 are mounted on the lower ends of the restraining rods and serve as stops for limiting downward swinging movement of the frames. Helical compression springs 77 surround the upper ends of the restraining rods 73, are interposed between the nuts 75 and the upper faces of the plates 74 and serve as means for cushioning the frames when they are swung upwards to their fullest extent. Helical compression springs 78 surround the lower ends of the restraining rods 73, rest on the nuts 76 and serve as means for cushioning the brush carrying frames when they are swung downwards to their fullest extent.

The air cylinders 68 are associated with the brush carrying frames respectively and extend substantially vertically. They are of the single acting type or variety and are located directly rearwards of the restraining rods 73. Pistons 79 are mounted in the air cylinders 68 for vertical sliding movement. The lower ends of such cylinders are pivotally connected to upstanding brackets 80 on horizontally extending plates 81 which are connected to, and extend inwards from, the lower ends of the vertically extending plates 20 of the carriage 11. The pivotal connections permit the air cylinders 68 to swing forwards and rearwards to a slight extent in connection with up and down swinging movement of the brush carrying frames. The pistons 79 are provided with upwardly extending piston rods 82 and these extend slidably through vented heads at the upper ends of the air cylinders 68 and having their upper ends pivotally connected to the rear or proximal ends of the arms 70. Air under pressure is introduced into the lower ends of the air cylinders 68 by way of flexible hoses 83 which include valves (not shown) for air controlling purposes. When the valves are opened air under pressure is introduced into the lower ends of the cylinders 68 and force the pistons 79 upwards. Upward sliding movement of the pistons operates to swing the brush carrying frames 12 downwards, i. e., in a clockwise direction as viewed in Figures 1 and 3. It is contemplated that when the apparatus is in use air under pressure will be supplied to the air cylinders 68 in order that the latter will operate first to swing the brush carrying frames downwards and then yieldingly to maintain the brushes in contact with the eaves of the roof of the car being washed. It is also contemplated that at the close of an eaves washing operation the supply of air under pressure to the air cylinders will be cut off. As soon as the air cylinders 68 are rendered inoperative by closing the aforementioned valves in the hoses 83 the counterweights 67, due to their weight, will automatically swing the frames 12 upwards into their inoperative position wherein the brushes are located above the roof level. The air cylinders 68 are sufficiently powerful to overcome the weight of the counterweights 67 when they are energized or rendered operative by the supply of air under pressure thereto.

The double acting air cylinders 69 for rocking or tilting the frames 12 together with the brushes 13 into different angular positions are located outwards of the rear or distal ends of the rearwardly extending arm-forming I-beams 44 and extend substantially vertically. They have pistons 84 slidably mounted therein and are pivotally connected to, and depend from, cantilever type brackets 85 which are welded or otherwise fixedly secured to the upper flanges of the I-beams 44. The pistons 84 in the double acting air cylinders 69 embody depending piston rods 86 and these extend slidably through packing glands in heads 87 on the lower ends of the cylinders 69 and are operatively connected to the rock shafts 45 by way of substantially horizontal levers 88. Such levers are fixedly connected to, and project radially from, the rock shafts 44. The lower ends of the piston rods 86 are pivotally connected to the outer ends of the levers 88 by way of clevises 89. When the pistons are slid downwards as a result of induction of air under pressure into the upper ends of the cylinders 69 and release of air under pressure from the lower ends of said cylinders the frames 12 together with the brushes 13 are tilted in one direction and when the pistons are slid upwards as the result of introduction of air into the lower ends of the air cylinders 69 and release of air under pressure from the upper ends of such cylinders the brush carrying frames are tilted in the opposite direction. Air under pressure is supplied to the upper ends of the double acting air cylinders 69 by way of flexible hoses 90 and air under pressure is supplied to the lower ends of said cylinders by flexible hoses 91. Valves (not shown) are included in the hoses 90 and 91 and it is contemplated that such valves will be of the type or construction that they may be manipulated so as to cause the pistons 84 to move downwards or upwards and also manipulated into closed position wherein they lock air under pressure both above and below the pistons in order that the pistons are yieldingly held against sliding movement in the cylinders 69. By properly controlling the aforementioned valves in the hoses 90 and 91 the brushes may be tilted into any desired angular position for proper contact with the eaves of the car being washed and the air cylinders will yieldingly hold the brushes in such position. Rocking or tilting of the brush carrying frames is limited or restricted by a pair of upstanding restraining rods 92. These rods are located inwards of the rear ends of the arm forming I-beams 44 and overlie the inner portions of the top plates 41 of the brush carrying frames. The lower ends of the restraining rods 92 are pivotally connected by clevises 93 to the outer ends of substantially horizontal levers 94. The latter are rigidly connected to, and project radially from, the rock shafts 45. The central portions of the restraining rods 92 extend loosely through holes in horizontally extending brackets 95. Such brackets are welded or otherwise fixedly secured to the inner margins of the upper flanges of the I-beams 44. Nuts 96 are mounted on the upper ends of the rods 92 and serve as stops for limiting tilting of the brush carrying frames in connection with upward sliding of the pistons 84. Nuts 97 are mounted on the lower central portions of the restraining rods 92 and serve as stops for limiting reverse tilting of the brush carrying frames in connection with downward sliding of the pistons 84 in the double acting cylinders 69. Helical compression springs 98 are interposed between the nuts 96 and the brackets 95 and helical compression springs 99 are interposed between the nuts 97 and the under side of the bracket 95. Such springs serve as cushioning means for the brush carrying frames when the latter are tilted in either direction to their fullest extent in connection with actuation of the double acting air cylinders 69.

When it is desired to use the apparatus for eaves washing purposes the car C is propelled rearwards at a comparatively slow rate of speed through the inverted U-shaped supporting structure 10. Before the car reaches the apparatus the operator of the latter lowers the carriage 11 to the proper extent by effecting drive of the electric motor 23 in the proper direction. The operator also energizes the air cylinder 68 so as to cause them to swing the brush frames 12 downwards in opposition to the force of the counterweights 67. As soon as the eaves of the roof of the car are engaged by the brushes 13 the latter, in connection with drive or rotation thereof by their electric motors 59, effect washing of the eaves. The brushes are driven at a comparatively high rate of speed as the car is propelled past them and, due to the pivotal connections consisting of the horizontally extending shafts 43, are capable of riding over any protuberances on the eaves of the car roof. Due to the existence of the rock shafts 45 constituting parts of the mountings between the brush carrying frames 12 and the vertically slidable carriage 11 the brushes are capable of tilting transversely of the car so as to adapt themselves to any slight irregularities or changes in the contour of the eaves being washed. It is contemplated that a series or train of cars will be propelled at a slow rate of speed past the apparatus for the purpose of effecting washing of the car eaves by the brushes. In the event the slope or angularity of the eaves of the car directly following the previously washed car is different from the last mentioned car the angularity of the brushes 13 may be adjusted conformably by actuating to the proper extent the double acting air cylinders 69. By raising or lowering the carriage 11 the brushes 13 may be properly positioned to wash the eaves of cars that vary in height. After use of the apparatus the carriage 11 is raised to its fullest extent and the air cylinders 68 are de-energized. As soon as the supply of air to said cylinders is cut off the counterweights 67 operate in response to the action of gravity to swing the frames together with the brushes upwards into their inoperative position (see dotted lines in Figure 3).

The herein described eaves washing apparatus is essentially simple in design and effectively and efficiently fulfills its intended purpose. Due to the manner of mounting of the brush carrying frames 12 with respect to the carriage 11 the brushes in connection with an eaves washing operation are capable of readily conforming themselves to any irregularities in, or protuberances on, the eaves being washed. By employing the air cylinders 68 the brushes 13 engage the eaves being washed with proper pressure to effect the desired results from the standpoint of washing. The apparatus as a whole is so constructed and designed that it may be produced at a comparatively low cost and operated economically. By reason of the fact that the mountings between the brush carrying frames and the carriage are separate from one another the brushes are capable of swinging upwards and downwards and also tilting laterally independently of one another. However, raising and lowering of the carriage operates conjointly to raise and lower the frames and brushes.

Whereas the apparatus has been described in connection with the washing of eaves of the roof of a railway car it is to be understood that it may also be used to wash the eaves of the roofs of other vehicles. It is also to be understood that the invention is not to be restricted to the details set forth since these may be modified within the scope of the appended claims without departing from the spirit and scope of the invention.

Having thus described the invention what I claim as new and desire to secure by Letters Patent is:

1. An apparatus adapted for use in connection with washing of the eaves of the roof of a vehicle as the latter is propelled on a runway past it and comprising a rigid upstanding supporting structure arranged in straddled relation with the runway and embodying a pair of standards of greater height than the vehicle, a horizontally elongated carriage positioned so as to overlie the vehicle and extend transversely of the runway and having means between its ends and the upper portions of the standards whereby it is mounted to slide vertically to a limited extent, reversible power operated means mounted for the most part on the supporting structure and operative when driven in one direction to raise the carriage and when driven in the reverse direction to lower the carriage, a pair of elongated rotary brushes positioned adjacent the ends of the carriage respectively and inclined upwards and inwards in a direction crosswise of the runway, and individual mounting frames for the brushes provided with power means for driving said brushes and having pivotal means between them and the ends of the carriage whereby they are supported to raise and lower with said carriage and also to swing bodily and independently of one another upwards and downwards about horizontal axes that extend transversely of the runway and are laterally offset with respect to the brush axes, said brushes being adapted upon lowering of the carriage and propulsion of the vehicle under them yieldingly to engage the eaves of the vehicle roof.

2. An apparatus adapted for use in connection with washing of the eaves of the roof of a vehicle as the latter is propelled on a runway past it and comprising a rigid upstanding supporting structure arranged in straddled relation with the runway and embodying a pair of standards of greater height than the vehicle, a horizontally elongated carriage positioned so as to overlie the vehicle and extend transversely of the runway and having means between its ends and the upper portions of the standards whereby it is mounted to slide vertically to a limited extent, power operated means for raising and lowering the carriage, a pair of elongated rotary brushes positioned adjacent the ends of the carriage respectively and inclined upwards and inwards in a direction crosswise of the runway, and individual mounting frames for the brushes provided with electric motors for driving the brushes and having pivotal means between them and the ends of the carriage whereby they are supported to raise and lower with said carriage and also to tilt laterally up and down to a limited extent about axes that are disposed above, and substantially midway between the ends of, the brushes, said brushes being adapted upon lowering of the carriage and propulsion of the vehicle under said carriage to engage the eaves of the vehicle roof.

3. An apparatus adapted for use in connection with washing of the eaves of the roof of a vehicle as the latter is propelled on a runway past it and comprising a rigid upstanding supporting structure arranged in straddled relation with the runway and embodying a pair of standards of greater height than the vehicle, a horizontally elongated carriage positioned so as to overlie the vehicle and extend transversely of the runway and having means between its ends and the upper portions of the standards whereby it is supported to slide vertically to a limited extent, reversible power operated means mounted for the most part on the supporting structure and operative when actuated in one direction to raise the carriage and when operated in the reverse direction to lower the carriage, a pair of elongated rotary brushes positioned adjacent the ends of the carriage respectively and inclined upwards and inwards in a direction crosswise of the runway, and individual mounting frames for the brushes provided with motors for driving said brushes and having pivotal means between them and the ends of the carriage whereby they are supported to raise and lower with the carriage, to swing bodily and independently of one another upwards and downwards about horizontal axes that extend transversely of the runway and are laterally offset with respect to the brush axes, and also to tilt laterally up and down to a limited extent about axes that are disposed above, and substantially midway between the ends of, the brushes, said brushes being adapted upon lowering of the carriage and propulsion of the vehicle under said carriage yieldingly to engage the eaves of the vehicle roof.

4. An apparatus adapted for use in connection with washing of the eaves of a vehicle as the latter is propelled on a runway past it and comprising a rigid upstanding inverted U-shaped supporting structure arranged in straddled relation with the runway, a pair of elongated rotary brushes positioned adjacent but inwards of the upper corners of the supporting structure respectively and inclined upwards and inwards in a direction crosswise of the runway, and a pair of individual mounting frames for the brushes embodying power means for driving said brushes and provided with pivotal supporting means whereby they are supported to swing bodily and independently of one another upwards and downwards about horizontal axes that extend transversely of the runway and also to tilt laterally up and down to a limited extent about axes that are disposed above, and substantially midway between the ends of, the brushes, said brushes being adapted during propulsion of the vehicle past said supporting structure yieldingly to engage the eaves of the vehicle roof.

5. An apparatus adapted for use in connection with washing part of the roof of a vehicle as the latter is propelled on a runway past it and comprising a supporting structure embodying a standard at one side of the runway, an elongated rotary power driven brush located adjacent the upper portion of the standard, having frame means for supporting it inclined upwards and inwards in a direction crosswise of the runway, and adapted to engage one of the side eaves of the vehicle roof, a mounting between the frame means and the supporting structure, embodying pivotally connected parts, and having such parts arranged and designed to support said brush so that it is capable of swinging bodily upwards and downwards to a limited extent and also tilting transversely of the vehicle about an axis above, and substantially midway between the ends of, the brush, and power actuated means extending between, and connected to, one part of the mounting and said frame means and operative in connection with actuation thereof to tilt the brush into different angular positions and yieldingly to maintain the brush in the position into which it is tilted.

6. An apparatus adapted for use in connection with washing part of the roof of a vehicle as the latter is propelled on a runway past it and comprising a supporting structure embodying a standard at one side of the runway, an elongated rotary power driven brush located adjacent the upper portion of the standard, having frame means for supporting it, inclined upwards and inwards in a direction crosswise of the runway, and adapted to engage one of the side eaves of the vehicle roof, a mounting between the frame means and the supporting structure, embodying pivotally connected parts and having said parts arranged and designed to support said brush so that it is capable of swinging bodily upwards and downwards to a limited extent and also tilting transversely of the vehicle to a limited extent, and a double acting air actuated cylinder-piston device extending between, and pivotally connected to, one part of the mounting and said frame means and operative in connection with actuation thereof to tilt the brush in different angular positions and yieldingly to maintain the brush in the position into which it is tilted.

7. An apparatus adapted for use in connection with washing part of the roof of a vehicle as the latter is propelled on a runway past it and comprising a supporting structure embodying a standard at one side of the runway, an elongated rotary power driven brush located adjacent the upper portion of the standard, having frame means for supporting it inclined upwards and inwards in a direction crosswise of the runway, and adapted to engage one of the side eaves of the vehicle roof, a mounting between the frame means and the supporting structure, embodying pivotally connected parts and having such parts arranged and designed to support said brush so that it is capable of swinging bodily upwards and downwards to a limited extent and also tilting transversely of the vehicle to a limited extent, an air energizable cylinder-piston device extending between, and connected to, one part of the mounting and said frame means and operative when energized yieldingly to urge the brush bodily downwards, and a double acting air energizable cylinder-piston device extending between, and connected to other parts of said mounting and operative when energized to tilt the brush in different angular positions and yieldingly to maintain the brush in the position into which it is tilted.

8. An apparatus adapted for use in washing a portion of the roof of a vehicle as the latter is propelled on a runway past it and comprising a supporting structure embodying a standard at one side of the runway, an elongated rotary power driven brush located adjacent the upper portion of the standard, inclined upwards and inwards in a direction crosswise of the runway and adapted to engage one of the side eaves of the vehicle roof in connection with propulsion of the vehicle past the supporting structure, a mounting between the brush and the supporting structure operative to support said brush so that it is capable of swinging bodily upwards and downwards and also tilting transversely of the vehicle and embodying an arm extending lengthwise of the runway and pivoted at one end thereof on a horizontal axis at right angles to said runway to swing upwards and downwards, and a brush carrying frame disposed beneath the other end of the arm and having a pivotal connection between it and said other end of the arm whereby it is supported to tilt about an axis in substantially parallel relation with the arm, means for urging the arm downwards, and a double acting fluid pressure actuated cylinder-piston device having one part thereof connected to the arm and another of its parts operatively connected to the frame, and adapted when actuated to tilt the brush carrying frame into different angular positions.

9. An apparatus adapted for use in washing a portion of the roof of a vehicle as the latter is propelled on a runway past it and comprising a supporting structure embodying a standard at one side of the runway, an elongated rotary power driven brush located adjacent the upper portion of the standard, inclined upwards and inwards in a direction crosswise of the runway and adapted to engage one of the side eaves of the vehicle roof in connection with propulsion of the vehicle past the supporting structure, a mounting between the brush and the supporting structure operative to support said brush so that it is capable of swinging bodily upwards and downwards and also tilting transversely of the vehicle and embodying an arm extending lengthwise of the runway and pivoted at one end thereof on a horizontal axis at right angles to said runway to swing upwards and downwards, and a brush carrying frame disposed beneath the other end of the arm and having a pivotal connection between it and said other end of the arm whereby it is supported to tilt about an axis in substantially parallel relation with the arm, an air cylinder extending between the supporting structure and the mounting and operative when energized yieldingly to urge the arm downwards, and a double acting air energizable cylinder-piston device having one part thereof connected to the arm and another of its parts operatively connected to the frame and adapted when air under pressure is supplied thereto to tilt the frame in different angular positions and yieldingly to hold said frame in the position into which it is tilted.

10. An apparatus adapted for use in washing a portion of a vehicle as the latter is propelled on a runway past it and comprising a supporting structure embodying a standard at one side of the runway, an elongated rotary power driven brush located adjacent the upper portion of the standard, inclined upwards and inwards in a direction crosswise of the runway and adapted to engage one of the side eaves of the vehicle roof in connection with propulsion of the vehicle past the supporting structure, a mounting between the brush and the supporting structure operative to support said brush so that it is capable of tilting transversely of the vehicle and embodying an arm extending lengthwise of the runway and having rotatably mounted thereon in parallel relation therewith a rock shaft with a laterally extending lever, and a brush carrying frame fixedly connected to the rock shaft and arranged to tilt the brush in response to rocking of the shaft, and power means for tilting the brush into different angular positions consisting of a fluid actuated cylinder-piston device extending between, and connected to, the arm and the outer end of the lever.

11. An apparatus adapted for use in washing a portion of the roof of a vehicle as the latter is propelled on a runway past it and comprising a supporting structure embodying a standard at one side of the runway, an elongated rotary power driven brush located adjacent the upper portion of the standard, inclined upwards and inwards in a direction crosswise of the runway and adapted to engage one of the side eaves of the vehicle roof in connection with propulsion of the vehicle past the supporting structure, a mounting between the brush and the supporting structure operative to support said brush so that it is capable of swinging bodily upwards and downwards and also tilting transversely of the vehicle and embodying an arm extending lengthwise of the runway, pivoted at one end thereof to swing upwards and downwards, and having rotatably mounted thereon in parallel relation therewith a rock shaft with a fixed laterally extending lever, and a brush carrying frame fixedly connected to the rock shaft and arranged to tilt the brush in response to rocking of the shaft, and a double acting fluid pressure actuated cylinder-piston device extending between, and pivotally connected to, the arm and the outer end of the lever and operative when actuated to rock the rock shaft so as to tilt the frame and brush into different angular positions.

12. An apparatus adapted for use in washing a portion of a vehicle as the latter is propelled on a runway past it and comprising a supporting structure embodying a standard at one side of the runway, an elongated rotary power driven brush located adjacent the upper portion of the standard, inclined upwards and inwards in a direction crosswise of the runway and adapted to engage one of the side eaves of the vehicle roof in connection with propulsion of the vehicle past the supporting structure, a mounting between the brush and the supporting structure operative to support said brush so that it is capable of tilting transversely of the vehicle and embodying an arm extending lengthwise of the runway and having rotatably mounted thereon in parallel relation therewith a rock shaft, and a brush carrying frame connected to the rock shaft so as to rock therewith and also so that it is adjustable laterally relatively thereto, and power means for rocking the shaft in order to tilt the frame and brush into different angular positions.

13. An apparatus adapted for use in washing a portion of the roof of a vehicle as the latter is propelled on a runway past it and comprising a supporting structure embodying a standard at one side of the runway, an elongated rotary power driven brush located adjacent the upper portion of the standard, inclined upwards and inwards in a direction crosswise of the runway and adapted to engage one of the side eaves of the vehicle roof in connection with propulsion of the vehicle past the supporting structure, a mounting between the brush and the supporting structure operative to support said brush so that it is capable of tilting transversely of the vehicle and embodying an arm extending lengthwise of the runway and having rotatably mounted thereon in parallel relation therewith a rock shaft with a pair of oppositely extending levers thereon, and a brush carrying frame having the central portion thereof fixedly connected to the rock shaft, means including a restraining rod between the arm and the outer end of one of the levers for limiting rocking of the shaft, and a double acting fluid pressure actuated cylinder-piston device extending between, and pivotally connected to, the arm and the outer end of the other lever and operative when actuated to rock the shaft in order to tilt the frame and brush into different angular positions.

LOUIS D. HOLMES.

References Cited in the file of this patent
UNITED STATES PATENTS

| Number | Name | Date |
|---|---|---|
| 695,255 | Wheeler | Mar. 11, 1902 |
| 1,798,215 | Neilson | Mar. 31, 1931 |
| 1,827,887 | Gillespie | Oct. 20, 1931 |
| 1,908,788 | Pulliam | May 16, 1933 |
| 1,962,167 | Zimmer | June 12, 1934 |
| 2,175,296 | Kirkman | Oct. 10, 1939 |
| 2,215,692 | Fleming | Sept. 24, 1940 |
| 2,248,699 | Finnell | July 8, 1941 |
| 2,257,255 | Yingling | Sept. 30, 1941 |
| 2,296,934 | Kirkman et al. | Sept. 29, 1942 |
| 2,299,850 | Schafer et al. | Oct. 27, 1942 |